(12) United States Patent
Newman

(10) Patent No.: US 11,288,763 B1
(45) Date of Patent: Mar. 29, 2022

(54) SYSTEMS AND METHODS FOR VISUALLY ENCODING INFORMATION INTO A PIXEL-BASED IMAGE

(71) Applicant: GoPro, Inc., San Mateo, CA (US)

(72) Inventor: David Newman, San Diego, CA (US)

(73) Assignee: GoPro, Inc., San Mateo, CA (US)

(*) Notice: Subject to any disclaimer, the term of this patent is extended or adjusted under 35 U.S.C. 154(b) by 409 days.

(21) Appl. No.: 16/517,219

(22) Filed: Jul. 19, 2019

Related U.S. Application Data

(60) Provisional application No. 62/864,645, filed on Jun. 21, 2019.

(51) Int. Cl.
    *G06K 9/00* (2006.01)
    *G06T 1/00* (2006.01)
    *H04N 1/32* (2006.01)

(52) U.S. Cl.
    CPC ......... *G06T 1/0028* (2013.01); *H04N 1/3224* (2013.01)

(58) Field of Classification Search
    CPC ....... G06K 19/06103; G06K 19/06056; G06K 9/00; G06K 9/2054; H04N 19/46; H04N 19/154; H04N 5/2628; H04N 13/189; H04N 2201/3233; H04N 2201/3235; H04N 2201/327; H04N 5/341; G06T 2201/0051; G06T 1/0028; G06T 2201/0061; G06T 1/0021; G06T 1/005; G06T 2201/0065; G06T 1/0064; G06T 2201/0083; G06T 3/0087
    See application file for complete search history.

(56) References Cited

U.S. PATENT DOCUMENTS

| | | | |
|---|---|---|---|
| 8,538,886 B1* | 9/2013 | Iu | G06T 1/005 705/51 |
| 8,625,909 B2* | 1/2014 | Shimauchi | H04N 19/91 382/232 |
| 10,424,038 B2* | 9/2019 | Holub | G06T 1/005 |
| 10,979,691 B2* | 4/2021 | Forutanpour | H04N 19/70 |
| 2005/0244032 A1* | 11/2005 | Shi | H04N 21/23892 382/100 |
| 2006/0115110 A1* | 6/2006 | Rodriguez | B41M 3/10 382/100 |
| 2009/0052793 A1* | 2/2009 | Huang | G06T 1/0028 382/254 |
| 2017/0251208 A1* | 8/2017 | Adsumilli | H04N 19/597 |
| 2017/0295356 A1* | 10/2017 | Abbas | H04N 13/282 |
| 2017/0301065 A1* | 10/2017 | Adsumilli | G06T 5/001 |
| 2018/0053284 A1* | 2/2018 | Rodriguez | G06T 3/0093 |

* cited by examiner

*Primary Examiner* — Shervin K Nakhjavan

(74) *Attorney, Agent, or Firm* — Esplin & Associates, PC

(57) ABSTRACT

Information may be visually encoded within visual content of an image using a distortion projection. The distortion projection may cause stretching of a visual element defined within a pixel array of the image. Information may be visually encoded within the pixel array using visual characteristic(s) of the pixel array. Presentation of the visual content based on a non-distortion projection may reduce a number of pixels that defines the visual element within the pixel array and may reduce visual impact of the information visually encoded within the pixel array.

20 Claims, 5 Drawing Sheets

SYSTEMS AND METHODS FOR VISUALLY ENCODING INFORMATION INTO A PIXEL-BASED IMAGE

FIELD

This disclosure relates to visually encoding information into a pixel-based image.

BACKGROUND

Information relating to visual content may be useful/important for editing, playing, and/or otherwise consuming the visual content. Visual applications, such as players and/or effects tools, may not have a mechanism to receive and/or communicate such information.

SUMMARY

This disclosure relates to visually encoding information into a pixel-based image. Visual information and/or other information may be obtained. The visual information may define visual content of an image. The visual content may include visual elements defined by pixels. The visual elements may include a first visual element and/or other visual elements. Insertion information to be visually encoded within the visual content may be obtained. A pixel array of the image to convey the insertion information may be identified based on a distortion projection of the visual content and/or other information. The distortion projection may cause stretching of one or more of the visual elements such that the first visual element is defined within the pixel array. The insertion information may be encoded within the pixel array using one or more visual characteristics of the pixel array and/or other information. Presentation of the visual content based on a non-distortion projection may reduce a number of pixels that defines the first visual element and may reduce visual impact of the insertion information encoded within the pixel array.

A system that visually encodes information into a pixel-based image may include one or more electronic storages, one or more processors, and/or other components. An electronic storage may store visual information, information relating to images, information relating to visual content, information relating to visual elements, insertion information, information relating to pixel array of images to convey insertion information, information relating to distortion projection, information relating to non-distortion projection, information relating to encoding of insertion information, information relating to visual characteristics of pixel array, and/or other information.

The processor(s) may be configured by machine-readable instructions. Executing the machine-readable instructions may cause the processor(s) to facilitate visually encoding information into a pixel-based image. The machine-readable instructions may include one or more computer program components. The computer program components may include one or more of a visual information component, an insertion information component, an identification component, an encode component, and/or other computer program components.

The visual information component may be configured to obtain visual information and/or other information. The visual information may define visual content of an image. The image may include a wide-angle image. The visual content may include visual elements defined by pixels of the image. The visual elements including a first visual element and/or other visual elements.

The insertion information component may be configured to obtain insertion information to be visually encoded within the visual content and/or other information. In some implementations, the insertion information may include rotation information. The rotation information may define one or more rotations to be performed on the visual content.

The identification component may be configured to identify a pixel array of the image to convey the insertion information. The pixel array may be identified based on a distortion projection of the visual content and/or other information. The distortion projection may cause stretching of one or more of the visual elements such that the first visual element is defined within the pixel array.

In some implementations, the visual information may define the visual content based on the distortion projection. In some implementations, the visual information may define the visual content based on the non-distortion projection such that the first visual element is defined within a first set of pixels. The first set of pixels may include less pixels than the pixel array.

In some implementations, the distortion projection may include an equirectangular projection. The pixel array may include one or more rows of the pixels located at a top and/or a bottom of the visual content.

In some implementations, the distortion projection may include a fish-eye projection. The pixel array may include one or more groups of pixels located at one or more corners of the visual content.

The encode component may be configured to encode the insertion information and/or other information within the pixel array. Information may be encoded within the pixel array using one or more visual characteristics of the pixel array. Presentation of the visual content based on a non-distortion projection may reduce a number of pixels that defines the first visual element and reduces visual impact of the insertion information encoded within the pixel array.

In some implementations, the insertion information may include rotation information and the image may include a video frame of a video. Stabilization of the video may be performed based on the rotation information visually encoded within the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
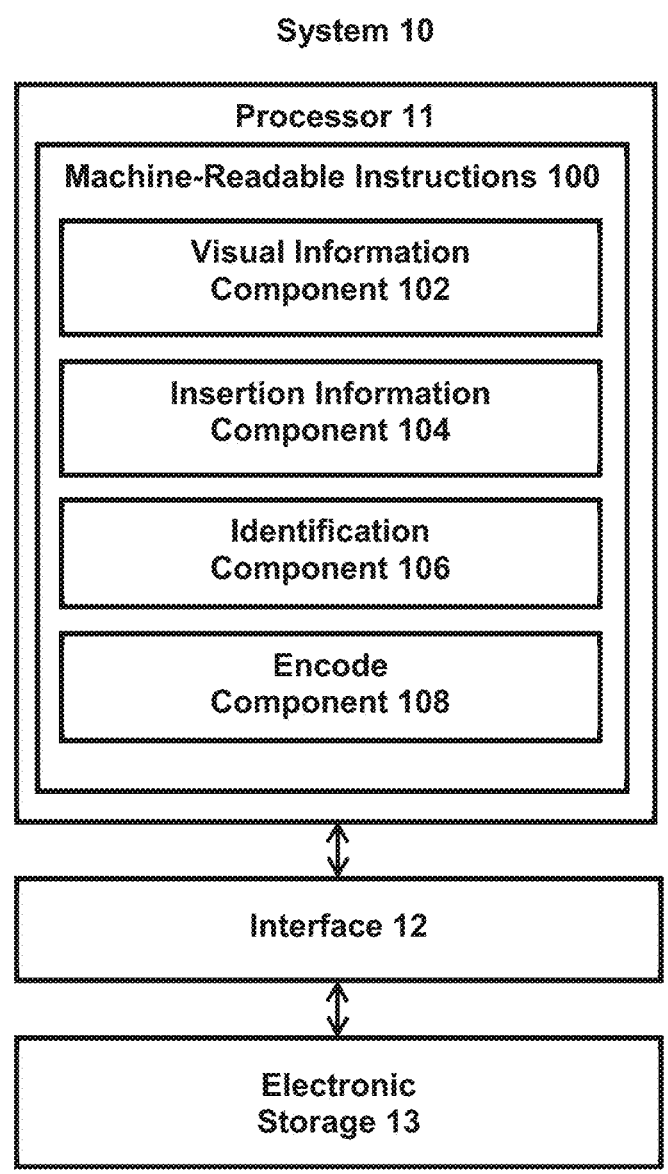
FIG. 1 illustrates an example system that visually encodes information into a pixel-based image.

FIG. 1 illustrates a system 10 for visually encoding information into a pixel-based image. The system 10 may include one or more of a processor 11, an interface 12 (e.g., bus, wireless interface), an electronic storage 13, and/or other components. Visual information and/or other information may be obtained by the processor 11. The visual information may define visual content of an image. The visual content may include visual elements defined by pixels. The visual elements may include a first visual element and/or other visual elements. Insertion information to be visually encoded within the visual content may be obtained. A pixel array of the image to convey the insertion information may be identified based on a distortion projection of the visual content and/or other information. The distortion projection may cause stretching of one or more of the visual elements such that the first visual element is defined within the pixel array. The insertion information may be encoded within the pixel array using one or more visual characteristics of the pixel array and/or other information. Presentation of the visual content based on a non-distortion projection may reduce a number of pixels that defines the first visual element and may reduce visual impact of the insertion information encoded within the pixel array.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to images, information relating to visual content, information relating to visual elements, insertion information, information relating to pixel array of images to convey insertion information, information relating to distortion projection, information relating to non-distortion projection, information relating to encoding of insertion information, information relating to visual characteristics of pixel array, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate visually encoding information into a pixel-based image. The machine-readable instructions 100 may include one or more computer program components. The machine-readable instructions 100 may include one or more of a visual information component 102, an insertion information component 104, an identification component 106, an encode component 108, and/or other computer program components.

The visual information component 102 may be configured to obtain visual information and/or other information. Obtaining visual information may include one or more of accessing, acquiring, analyzing, determining, examining, identifying, loading, locating, opening, receiving, retrieving, reviewing, storing, and/or otherwise obtaining the visual information. The visual information component 102 may obtain visual information from one or more hardware components (e.g., an image sensor, electronic storage) and/or one or more software components (e.g., software running on a computing device).

In some implementations, the visual information component 102 may obtain visual information based on user interaction with a user interface/application (e.g., image/video editing application, image/video player application), and/or other information. For example, a user interface/application may provide option(s) for a user to select one or more pixel-based images into which information is to be visually encoded. The visual information defining the image(s) may be obtained based on the user's selection of the image(s) through the user interface/application. Other selections of images are contemplated.

The visual information may define visual content of one or more images. Visual content may refer to content of one or more images that may be consumed visually. An image may include a standalone image or an image within a sequence of images (e.g., burst images, video frames). Visual content may be generated based on light received within a field of view of a single image sensor or within fields of view of multiple image sensors during a capture period. Visual content may include visual elements and/or other visually consumable content. Visual elements may refer to parts of the visual content. One or more visual elements may form depiction of things (e.g., persons, objects, scene, environment, space) included within the visual content. Visual elements may be defined by one or more pixels. Visual elements included within visual content of an image may be defined by one or more pixels of the image. For example, visual content of an image may include a first visual element defined by one or more pixels of the image and/or other visual elements. The first visual element and/or other visual elements of the visual content may be modified to visually convey information. Information (e.g., insertion information) may be visually encoded within pixels defining the first visual element and/or other visual elements by modifying one or more visual characteristics of the pixels.

In some implementations, an image may include a wide-angle image, and the visual information may define visual content of one or more wide-angle images. A wide-angle image may refer to an image captured through use of one or more wide-angle optical elements, such as one or more wide-angle lens. In some implementations, a wide-angle lens may include a viewing angle of more than about 60 degrees.

A wide-angle image may include a spherical image. A spherical image may include visual content viewable from one or more points of view (e.g., within a sphere, center of a sphere). Spherical visual content may be generated through capture of multiple views from a single location. Spherical visual content may be captured through the use of one or more image capture devices (e.g., image sensors, cameras) to capture images from a location. The captured images may be stitched together to form the spherical visual content of the spherical image. Spherical visual content may include full spherical visual content (360 degrees of capture) or partial spherical visual content (less than 360 degrees of capture). Partial spherical visual content may be referred to as panoramic visual content.

How visual elements are arranged within the visual content may depend on projection of the visual content. Projection of visual content may refer to how portions of the visual content are mapped onto a two-dimensional plane (e.g., two-dimensional image). Visual content on an image may be mapped using a single projection or multiple projections (e.g., different projections at different times; different projections for different portions of the image). For example, a distortion projection may arrange visual elements of visual content such that one or more visual elements are stretched (e.g., at the top or bottom of an image arranged using an equirectangular projection). Example projections may include rectilinear projection, cylindrical projection, Mercator projection, Miller projection, Lambert projection, equirectangular projection, stereographic projection, fisheye projection, equisolid projection, orthographic projection, cubic projection, sinusoidal projection, transverse projection (rotation of a projection by 90 degrees), Panini projection, architectural projection, and/or other projections.

Projections may include non-distortion projections, distortion projections, and/or other projections. A non-distortion projection may refer to a projection that arranges visual element of visual content such that depictions of things within the visual content is not visually distorted (e.g., stretched, warped, compressed). For example, a non-distortion projection may arrange visual elements of visual content such that a depiction of a straight line appears straight. A distortion projection may refer to a projection that arranges visual element of visual content such that one or more depictions of things within the visual content are visually distorted (e.g., stretched, warped, compressed). A distortion projection may distort the depictions of things linearly or non-linearly (e.g., as a function of lateral and/or vertical position within the visual content). A distortion projection may distort the depictions of things uniformly or non-uniformly.

Distortions may cause different number of pixels to define visual elements of the visual content. For example, stretching of a visual element may cause more pixels of an image to define the visual element while compression of a visual element may cause fewer pixels of the image to define the visual element.

Projection of visual content may be used for visual content presentation, visual content storage, visual content analysis, and/or other use of the visual content. For example, different projections of the visual content may be used to present different views (e.g., non-distorted view, distorted view) of the visual content. Different projections of the visual content may be used to store the visual content with different views. Different projections of the visual content may be used to analyze the visual content in different views. For example, rectilinear projection may be used to arrange visual elements of visual content such that a depiction of a straight line appears straight within the visual content while equirectangular projection may be used to arrange visual elements of visual content such that only vertical lines and center horizontal lines appear straight while other lines appear curved within the visual content.

Figure 3A:
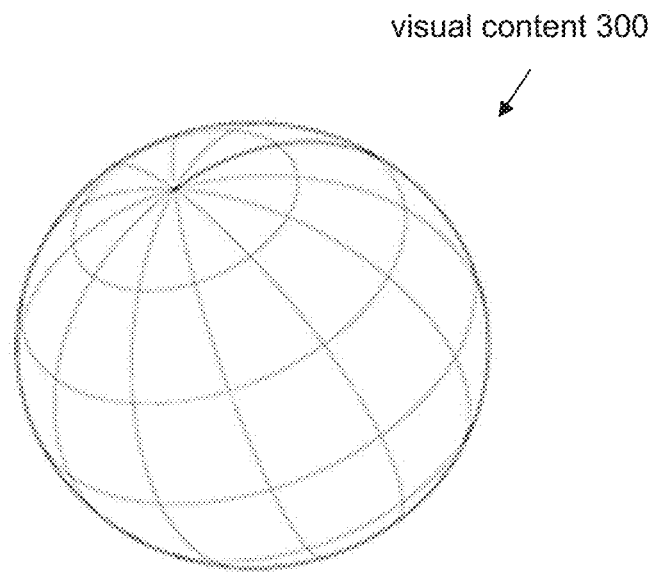
FIG. 3A illustrates example visual content.

FIG. 3A illustrates example visual content 300 of a spherical image. As shown in FIG. 3A, the spherical image may include the visual content 300 viewable from one or more points of view, such as the center of the sphere. One or more portions of the visual content 300 may be viewed at a time. For example, a viewing window may define one or more extents of the visual content 300 and the extent(s) of the visual content 300 within the viewing window may be presented (e.g., punched out). Use of non-distortion projection (e.g., rectilinear projection) may provide non-distorted view of the extent(s) of visual content 300 within the viewing window/punchout.

Figure 3B:
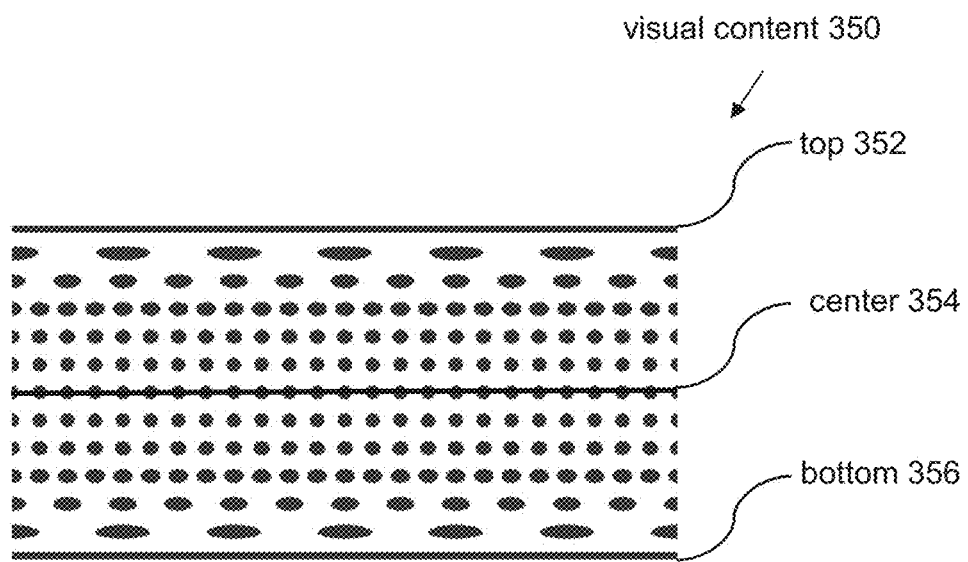
FIG. 3B illustrates example visual content projected using equirectangular projection.

FIG. 3B illustrates example visual content 350 projected using equirectangular projection. The visual content 350 may include a center portion in which visual elements are not distorted. For example, the visual elements of the visual content 350 along the center 354 may not be stretched, warped, compressed, and/or otherwise distorted. Visual elements in other parts of the visual content 350 may be distorted. For example, as shown in FIG. 3B, visual elements further away from the center 354 may be more stretched than other visual elements. Visual elements located at the top 352 and the bottom 356 may be stretched most. Visual elements located at the top 352 and the bottom 356 may be defined by greater number of pixels than if the visual content 300 is projected using a non-distortion projection.

Figure 4:
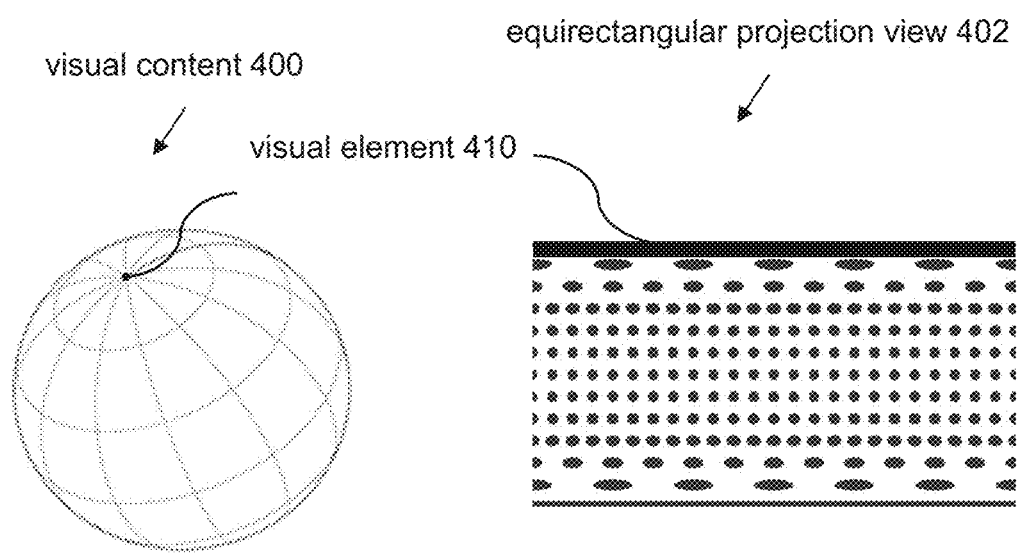
FIG. 4 illustrates an example distortion of spherical visual content with equirectangular projection

FIG. 4 illustrates an example distortion of spherical visual content with equirectangular projection. Visual content 400 may be spherical visual content. The visual content 400 may include a visual element 410 at the top. The visual element may be defined by a single pixel or a group of pixels (e.g., pixels forming a circle or a square) located the top of the visual content 400. Use of equirectangular projection for the visual content 400 may result in an equirectangular projection view 402. In the equirectangular projection view 402, the visual element 410 may be defined by an array of pixels located at the top of the equirectangular projection view 402. The array of pixels may include one or more rows of pixels across the top. Projection of the visual content 400 using the equirectangular projection may result in greater number of pixels being used to define the visual element 410.

Referring back to FIG. 1 the insertion information component 104 may be configured to obtain insertion information and/or other information. Obtaining insertion information may include one or more of accessing, acquiring, analyzing, determining, examining, identifying, loading, locating, opening, receiving, retrieving, reviewing, storing, and/or otherwise obtaining the insertion information. The insertion information component 104 may obtain insertion information from one or more hardware components (e.g., a motion sensor, a metadata generator, a stabilization chip, electronic storage) and/or one or more software components (e.g., software running on a computing device). Insertion information may be generated with the visual information or generate separately from the visual information. Insertion information may be generated based on the visual information and/or information relating to the visual information.

The insertion information may refer to information to be visually encoded within the visual content. The insertion information may include information related to and/or not related to the visual content into which it is encoded. Examples of insertion information may include presentation information, edit information, non-visual content information, metadata information, verification information, and/or other information. Other insertion information is contemplated.

Presentation information may refer to information that is used in presenting the visual content. For example, presentation information may include information used by one or more applications to present the visual content. For instance, presentation information may define and/or include information on which portions and/or which aspects of the visual content should be presented and/or what other information should be presented. For example, presentation information may include rotation information defining one or more rotations to be performed on the visual content for presentation, modification information defining one or more modifications to be performed on the visual content for presentation, overlay information defining one or more overlays (e.g., subtitle, sticker, comment) to be presented with the visual content, visual effect information defining one or more visual effects to be used in presenting the visual content, punchout information defining extent(s) of the visual content to be included within a viewing window/punchout, and/or other presentation information. The presentation information may be used during playback of the visual content to determine how the visual content is to be presented.

Edit information may refer to information that is used in editing the visual content. For example, edit information may include information used by one or more applications to edit the visual content. For instance, edit information may define and/or include information on which portions and/or which aspects of the visual content should be changed. For example, edit information may include user edit information defining one or more changes to the visual content made by one or more users. The edit information may be used during editing of the visual content to determine how the visual content is to be edited (e.g., retrieved edited version of the visual content, retrieve edits to the visual content).

Non-visual content information may refer to content that is presented non-visually with the visual content. For example, non-visual content information may include information used by one or more applications to provide audible and/or haptic content with the presentation of the visual content. For instance, non-visual content information may define and/or include information defining audio content (e.g., sound, music, recording) that is to be played back during presentation of the visual content, haptic content (e.g., vibration, motion) that is to be created during presentation of the visual content, and/or other non-visual content for presentation of the visual content. The non-visual content information may be used during playback of the visual content to determine what and how non-visual content is to be provided with presentation of the visual content.

Metadata information may refer to information that provides information about the visual content. Information about the visual content may include information about content of the visual content, capture of the visual content, and/or other information about the visual content. For example, metadata information may include content information defining one or more visual characteristics of the visual content, one or more classifications/identification of things, activities, and/or events depicted within the visual content, and/or other information relating to the content of the visual content. Metadata information may include capture information defining one or more characteristics of the image capture device(s) used to capture the visual content, such as location of capture, elevation of capture, motion of the image capture device(s) during capture, and/or other information relating to the capture of the visual content. The metadata information may be used to present information (e.g., metadata) about the visual content (e.g., during presentation and/or editing of the visual content).

Verification information may refer to information that provides information about verifying use of the visual content. Use of the visual content may include presentation of the visual content, editing of the visual content, and/or other use of the visual content. For example, verification information may define and/or include information that defining permissions for users/applications to present, edit, and/or otherwise use the visual content. The verification information may be used to control who has access and/or different types of access to present, edit, and/or otherwise use the visual content (e.g., restrict use to specific users, computers, applications).

The identification component 106 may be configured to identify one or more pixel arrays of the image(s) to convey the insertion information. A pixel array may refer to a collection of pixels in an image. Pixels within a pixel arrays may be horizontally arranged (e.g., include one or more row of pixels), vertically arranged (e.g., include one or more columns of pixels), and/or arranged in other shapes (e.g., diagonally arranged, arranged with one or more curvatures).

A pixel array to convey the insertion information may be identified by the identification component 106 based on a distortion projection of the visual content and/or other information. The distortion projection may cause stretching of one or more of the visual elements of the visual content such that the first visual element of the visual content is defined within the pixel array identified to convey the insertion information. Identification of the pixel array based on the distortion projection of the visual content may include identification of pixels corresponding to one or ore visual elements that have been and/or are distorted based on the distortion projection. For example, the pixel array defining the first visual element may be identified to convey the insertion information based on the distortion projection causing stretching of the first visual element and causing greater number of pixels to define the first visual element than when the visual content is projected using a non-distortion projection. In some implementations, the pixel array may be identified to include pixels that define one or more visual elements that have been and/or are most distorted (e.g., visual element stretched most) based on the distortion projection.

For example, referring to FIG. 4, the distortion projection may include an equirectangular projection, and the identified pixel array may include one or more rows of pixels located at the top and/or the bottom of the equirectangular projection view 402 of the visual content 400. For instance, the equirectangular projection may cause stretching of the visual element 410 across the top of the visual content 400 in the equirectangular projection view 402 and cause greater number of pixels to define the visual element 410 than when the visual content 400 is projection using non-distortion projection. For example, the visual element 410 may be defined by a single pixel in spherical representation of the visual content while the visual element 410 may be defined by one or more rows of pixels in the equirectangular projection view 402.

As another example, the distortion projection may include a fish-eye projection, and the identified pixel array may include one or more groups of pixels located at one or more corners of the visual content. The fish-eye projection may cause greater stretching of the visual elements in the corners than in other portions of the visual content. In some implementations, the fish-eye projection may cause corners of the image to not be displayed during presentation. For example, the corners of dual-fish eye images (forming a spherical image) may include space (e.g., blank/black space) that is not presented during presentation of the images. The pixel array may be identified to include pixels that define visual elements that are not presented during presentation of images. Use of other distortion projections are contemplated.

Figure 5:
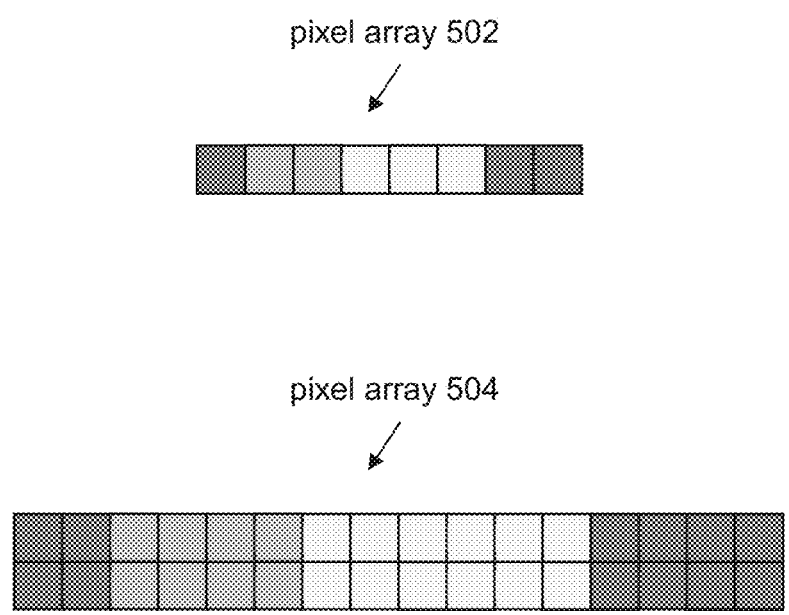
FIG. 5 illustrates example pixel arrays to convey insertion information.

In some implementations, the pixel array may be identified to include multiple pixels that include same portion of the insertion information. The pixel array including multiple pixels that include the same portion of the insertion information may increase robustness of the encoded insertion information. FIG. 5 illustrates example pixel arrays 502, 504 to convey insertion information. The pixel array 502 may include eight pixels arranged in a single row. The pixel array 504 may include thirty-two pixels arranged in two rows. Different information may be encoded into individual pixels via different intensities of the pixels. In the pixel array 502, individual pixels may be encoded with different portions of the insertion information. In the pixel array 504, individual set of four pixels (forming a square) may be encoded with different portions of the insertion information. Four pixels may form a pixel group. A pixel group may refer to one or more pixels forming a unit that is used to convey a portion of the insertion information.

The pixey array 504 may provide greater data robustness than the pixel array 502. For example, the image may be scaled (e.g., decrease in resolution) and encoding different portions of the insertion information into single pixels (a pixel group including a single pixel) as shown in the pixel array 502 may result in the information being lost due to scaling. For example, scaling may cause a group of four pixels to be merged into one pixel, and encoding different portions of the insertion information into individual ones of the four pixels may result in the encoded information being lost and/or distorted due to merging of the pixels when the image is scaled. Same scaling performed on the pixel array 504 may result in the scaled pixel array preserving the encoded information. For example, the scaling of the pixel array 504 may transform the pixel array 504 into the pixey array 502. Thus, the pixel array 504 may support one-half scaling/half-resolution decoding.

Dimensions of the pixel array may be configured to support different types of scaling/decoding. For example, using an 8×8 pixel group to encode a portion of the insertion information may provide support for ⅛ scaling and/or ⅛-resolution decoding. A pixel group to encode a portion of the insertion information may have same lateral and vertical dimensions or different lateral and vertical dimensions. For example, using a 2×4 pixel group to encode a portion of the insertion information may provide support for ½ lateral scaling and ¼ vertical scaling. Other dimensions of pixel arrays and pixel groups are contemplated.

In some implementations, the visual information may define the visual content based on the distortion projection. For example, the image may be stored/formatted using the distortion projection. The identification component 106 may identify one or more pixel arrays of the stored image to convey the insertion information.

In some implementations, the visual information may define the visual content based on the non-distortion projection. For example, the image may be stored/formatted using the non-distortion projection. The identification component 106 may convert the visual content using the distortion projection and identify one or more pixel arrayed of the image in the distortion projection. Such conversion of the image may result in greater number of pixels defining a visual element in the converted image (in the distortion projection) than the number of pixels defining the visual element in the original image (in the non-distortion projection).

The encode component 108 may be configured to encode the insertion information and/or other information within the pixel array. Encoding the insertion information may include conversion of the insertion information from one form into another form. For example, encoding the insertion information may include conversion of the insertion information from its original form (e.g., binary form, numerical form, character form, symbol form) into a visual form. Encoding of the insertion information within the pixel array may include encoding of the insertion information based on the distortion projection.

Information may be encoded within the pixel array using one or more visual characteristics of the pixel array. Visual characteristics of a pixel array may refer to visual characteristics of pixels within the pixey array. Visual characteristics of a pixel may refer to one or more of feature, quality, quantity, trait, property, value, measurable factor, and/or other information that characterizes one or more visual aspects of the pixel. For example, visual characteristics of a pixel may include color characteristics and/or other visual characteristics. Color characteristics may define one or more characteristics of color in RGB (red, green, blue) color space, HSL (hue, saturation, lightness) color space, HSV (hue, saturation, value) color space, and/or other color space. For example, color characteristics may include one or more of red color characteristic, green color characteristic, blue color characteristic, hue characteristic, saturation characteristic, lightness characteristic, value characteristic, and/or other color characteristics.

The encode component 108 may encode the insertion information within the pixel array by setting and/or changing the values of the color characteristics of the pixel array. Different values of the color characteristics of the pixel array may correspond to different values of the insertion information. For example, values of the insertion information may be encoded within the pixel array by setting and/or changing the brightness and/or intensities of the pixels within the pixel array. Different values of brightness and/or intensities of the pixel within the pixel array may correspond to and/or represent different values of the insertion information.

In some implementations, the encode component 108 may be configured to encode the insertion information and/or other information within pixel arrays of multiple images. For example, a single pixel array may be insufficient to convey the insertion information (lack sufficient number of pixels to convey the insertion information), and the insertion information may be encoded across pixel arrays of multiple images. For example, a video may include video frames, and the insertion information may be encoded within pixel arrays of multiple video frames. Dimensions of the pixel arrays within different images may be the same or different.

In some implementations, the encode component 108 may be configured to encode encoding information within the pixel array. Encoding information may define and/or provide information on how insertion information is encoded within the pixel array. For example, visual characteristics of one or more group(s) of pixels (e.g., initial pixel group) within the pixel array may be set/changed to indicate the type of insertion information (e.g., presentation information versus metadata information) encoded within the pixel array, the number of pixels conveying the insertion information, the dimension of the pixel group, the dimension of the pixel array, the distortion projection used to identify and/or encode the pixel array, the number of images across which the insertion information is encoded, and/or other information to facilitate decoding of the information encoded within the pixel array.

Presentation of the visual content based on a non-distortion projection may reduce the visual impact of the insertion information encoded within the pixel array. The non-distortion projection may cause compression of one or more of the visual elements stretched in the distortion projection. For example, the non-distortion projection may compress one or more of the visual elements of the visual content such that fewer number of pixels define the first visual element (into which insertion information is visually encoded) compared to the number of pixels within the pixel array. Presentation of the visual content based on a non-distortion projection may reduce a number of pixels that defines the first visual element and thus reduce the visual impact of the insertion information encoded within the pixel array. For example, referring to FIG. 4, the insertion information may be encoded within one or more row of pixels defining the visual element 410 in the equirectangular projection view 402. Presentation of the visual content based on a non-distortion projection may compress the visual element 410 into a single pixel or a group of pixels (e.g., pixels forming a circle or a square). Thus, the impact of any change in visual characteristics of the visual content caused by visual encoding of the insertion information is reduced when the visual content is presented using a non-distortion projection (e.g., use of rectilinear projection within a viewing window/punchout including the visual element 410).

Visual encoding of the insertion information may take advantage of inherent inefficiencies of distortion projections. For instance, the equirectangular projection may use many pixels at the top and bottom of the image to store information on a small portion of the visual content in the non-distortion projection. The inherent inefficiencies of the equirectangular projection enables great amount of information to be visually encoded within the top and/or the bottom of the image, which has little impact when the image is projected using non-distortion projection. With respect to the fisheye projection, similar effect may be achieved by visually encoding insertion information into one or more corners of the image, which may include stretched visual element and/or visual elements which are not used when displaying the image. The use of the distortion projection to identify and visually encode insertion information enables an image to visually carry the insertion information with minimal visual impact when viewed using non-distortion projection.

Visual encoding of the insertion information may provide inherent synchronization of the insertion information. For example, different insertion information may be obtained for different images. Different insertion information may be visually encoded into images to which it relates. The visually encoded insertion information may provide per image information (e.g., presentation information, edit information, non-visual content information, metadata information, verification information) to present, edit, and/or otherwise consume the video frames.

For example, the insertion information may include rotation information and images may include video frames of a video. Stabilization of the video may be performed based on the rotation information visually encoded within the visual content of the video frames. For example, the video frames may have been captured by an image capture device experiencing motion (e.g., rotations) and the visual content of the video frames may be rotated to compensate for the motion to reduce shakiness/jitters in the video. The amount and/or direction of rotation to be performed for individual video frames may be visually encoded into the visual content of the video frames. Thus, the rotation information may be synchronized to the video frames based on the visual encoding of the rotation information into the corresponding video frames.

Encoding of the rotation information into the video frames may allow for stabilization of the video during presentation and/or editing of the video. Encoding of the rotation information into the video frames may preserve the captured video (raw video footage). Encoding of the rotation information into the video frames may allow for different stabilization of the video during presentation and/or editing (e.g., reducing stabilization and/or turning off stabilization to preserve shakiness/jitters during portion of the video in which the user/camera experienced a physical impact, such as hitting something or landing after a jump).

As another example, presentation information may define which extent(s) of the video frames should be presented/included within a punchout. The extent(s) of the video frames specified in the presentation information may form a recommend view (e.g., suggested view, default view) of the video. Other uses of the insertion information visually encoded within images are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
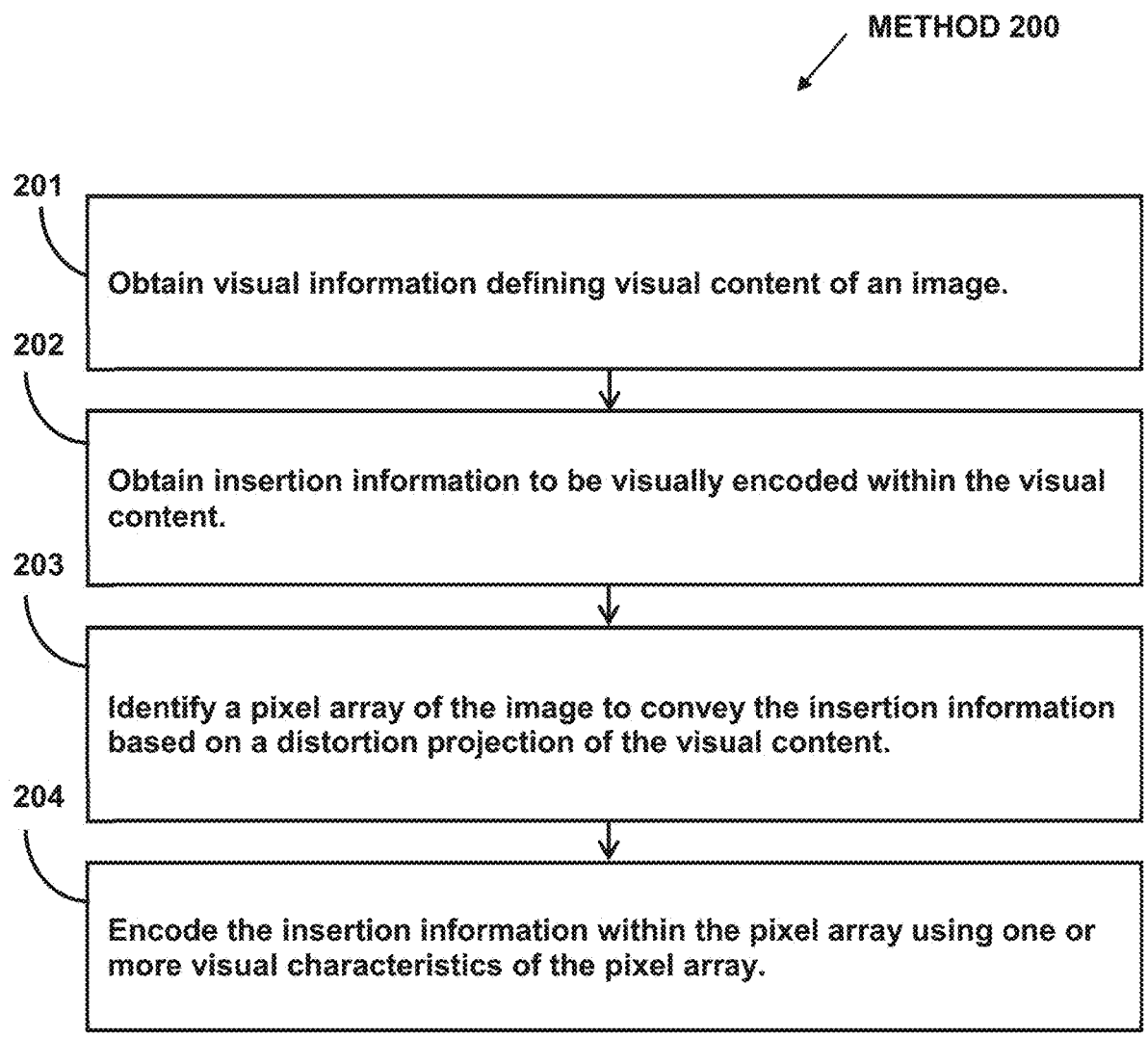
FIG. 2 illustrates an example method for visually encoding information into a pixel-based image.

FIG. 2 illustrates method 200 for visually encoding information into a pixel-based image. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information may be obtained. The visual information may define visual content of an image. The visual content may include visual elements defined by pixels. The visual elements including a first visual element and/or other visual elements. In some implementation, operation 201 may be performed by a processor component the same as or similar to the visual information component 102 (Shown in FIG. 1 and described herein).

At operation 202, insertion information to be visually encoded within the visual content may be obtained. In some implementation, operation 202 may be performed by a processor component the same as or similar to the insertion information component 104 (Shown in FIG. 1 and described herein).

At operation 203, a pixel array of the image to convey the insertion information may be identified based on a distortion projection of the visual content and/or other information. The distortion projection may cause stretching of one or more of the visual elements such that the first visual element is defined within the pixel array. In some implementation, operation 203 may be performed by a processor component the same as or similar to the identification component 106 (Shown in FIG. 1 and described herein).

At operation 204, the insertion information may be encoded within the pixel array using one or more visual characteristics of the pixel array and/or other information. Presentation of the visual content based on a non-distortion projection may reduce a number of pixels that defines the first visual element and may reduce visual impact of the insertion information encoded within the pixel array. In some implementation, operation 204 may be performed by a processor component the same as or similar to the encode component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:
1. A system for visually encoding information into a pixel-based image, the system comprising:
    one or more physical processors configured by machine-readable instructions to:

obtain visual information defining visual content of an image, the visual content including visual elements defined by pixels, the visual elements including a first visual element;

obtain insertion information to be visually encoded within the visual content;

identify a pixel array of the image to convey the insertion information based on a distortion projection of the visual content, the distortion projection causing stretching of one or more of the visual elements such that the first visual element is defined within the pixel array; and encode the insertion information within the pixel array using one or more visual characteristics of the pixel array, wherein presentation of the visual content based on a non-distortion projection reduces a number of pixels that defines the first visual element and reduces visual impact of the insertion information encoded within the pixel array.

2. The system of claim 1, wherein the visual information defines the visual content based on the non-distortion projection such that the first visual element is defined within a first set of pixels, the first set of pixels including less pixels than the pixel array.

3. The system of claim 1, wherein the visual information defines the visual content based on the distortion projection.

4. The system of claim 1, wherein the image includes a wide-angle image.

5. The system of claim 1, wherein the distortion projection includes an equirectangular projection.

6. The system of claim 5, wherein the pixel array includes one or more rows of the pixels located at a top and/or a bottom of the visual content.

7. The system of claim 1, wherein the distortion projection includes a fish-eye projection.

8. The system of claim 7, wherein the pixel array includes one or more groups of pixels located at one or more corners of the visual content.

9. The system of claim 1, wherein the insertion information includes rotation information, the rotation information defining a rotation to be performed on the visual content.

10. The system of claim 9, wherein the image includes a video frame of a video, and stabilization of the video is performed based on the rotation information.

11. A method for visually encoding information into a pixel-based image, the method performed by a computing system including one or more processors, the method comprising:

obtaining, by the computing system, visual information defining visual content of an image, the visual content including visual elements defined by pixels, the visual elements including a first visual element;

obtaining, by the computing system, insertion information to be visually encoded within the visual content;

identifying, by the computing system, a pixel array of the image to convey the insertion information based on a distortion projection of the visual content, the distortion projection causing stretching of one or more of the visual elements such that the first visual element is defined within the pixel array; and encoding, by the computing system, the insertion information within the pixel array using one or more visual characteristics of the pixel array, wherein presentation of the visual content based on a non-distortion projection reduces a number of pixels that defines the first visual element and reduces visual impact of the insertion information encoded within the pixel array.

12. The method of claim 1, wherein the visual information defines the visual content based on the non-distortion projection such that the first visual element is defined within a first set of pixels, the first set of pixels including less pixels than the pixel array.

13. The method of claim 11, wherein the visual information defines the visual content based on the distortion projection.

14. The method of claim 11, wherein the image includes a wide-angle image.

15. The method of claim 11, wherein the distortion projection includes an equirectangular projection.

16. The method of claim 15, wherein the pixel array includes one or more rows of the pixels located at a top and/or a bottom of the visual content.

17. The method of claim 11, wherein the distortion projection includes a fish-eye projection.

18. The method of claim 17, wherein the pixel array includes one or more groups of pixels located at one or more corners of the visual content.

19. The method of claim 1, wherein the insertion information includes rotation information, the rotation information defining a rotation to be performed on the visual content.

20. The method of claim 19, wherein the image includes a video frame of a video, and stabilization of the video is performed based on the rotation information.

* * * * *